United States Patent

[11] 3,555,280

[72] Inventor Chester L. Richards, Jr.
Costa Mesa, Calif.
[21] Appl. No. 543,755
[22] Filed Apr. 19, 1966
[45] Patented Jan. 12, 1971
[73] Assignee Hycon Manufacturing Co.
Monrovia, Calif.

[54] AUTOMATIC FOCUS SENSOR AND CONTROL
13 Claims, 8 Drawing Figs.
[52] U.S. Cl............................................. 250/201;
95/44; 250/234, 250/236; 350/6; 356/126
[51] Int. Cl....................................................... G03b 3/10,
G01j 1/20
[50] Field of Search............................................. 95/44, 45;
350/6, 273—275, 285; 356/16, 122, 123, 125,
126; 250/201, 204, 233, 234, 236, 237

[56] References Cited
UNITED STATES PATENTS
2,524,807 10/1950 Kallmann...................... 250/233X
2,922,351 1/1960 Hering.......................... 250/234X
2,972,276 2/1961 Whitney........................ 350/274

Primary Examiner—Robert Segal
Assistant Examiner—E. R. LaRoche
Attorney—Golove and Kleinberg ABSTRACT: The present invention provides apparatus for controlling the focus of an optical system by examining one spatial frequency from the spatial spectral response of the optical system. The system operates by modulating the image optical spectrum and by examining the signal produced to control the focus of the image. The preferred embodiment of the invention uses a rotating disc focus scanner, positioned between a transfer lens and a spatial filter to produce the necessary amplitude modulation.

Chester L. Richards, Jr.,
INVENTOR.

BY.

GOLOVE & KLEINBERG,
ATTORNEY.

Chester L. Richards, Jr.,
INVENTOR.
BY.

Golove & Kleinberg,
ATTORNEYS.

Chester L. Richards, Jr.,
INVENTOR.
BY.

GOLOVE & KLEINBERG,
ATTORNEYS.

AUTOMATIC FOCUS SENSOR AND CONTROL

This invention relates to focus detecting systems, and more particularly, to devices for controlling the focus of an image in a camera.

Aerial surveillance systems currently in use, for example, include cameras with lenses that exhibit high, on-axis resolutions. Surprisingly, it has generally been experienced that as a practical matter, photographs produced by such systems are of significantly lesser resolution.

A significant factor in resolution degeneration is defocusing of the lens that occurs during photographic exposure, whether caused by environmental effects or by uncontrolled altitude changes of the camera. A device which could automatically maintain the lens in optimum focus could be responsible for a significant improvement in overall system resolution.

According to the present invention, a signal is derived from a continuous monitoring of the camera image. This signal is used to control accurately the distance between the objective lens of the camera and the image plane with respect to the film supporting platen, automatically maintaining focus of the image produced in the emulsion plane of the film.

When used with a camera for aerial surveillance, for example, a preferred embodiment of the invention examines the aerial image produced at and near the emulsion plane of the film by the objective lens of the camera. Off-axis rays from the camera lens are selected for examination so as not to interfere with the image produced on the film. This examination of the image enables correction for the errors introduced by atmospheric effects upon the lens, which would be present in any system that determines target distance and sets focus for this distance. Furthermore, the examination of the image is continuous while the camera is in operation.

The present invention is not limited to use with aerial cameras, but may be used for sensing focus at a predetermined plane of any optical system and for automatically maintaining image focus at that plane. Examples of such use would be the incorporation of the present invention in opthalmic instrumentation, in television and motion picture camera systems, and in machine positioning and alignment.

Among the many elements of image focus error, perhaps the most important function is the overall target-to-image transfer function of the lens, or the lens "modulation transfer function." This function is determined by the transmission characteristics of the lens in terms of the sinusoidal variations of intensity which make up the light reflected from the target. These variations are known as "spatial frequencies," and their relative amplitudes in terms of the frequency of each component is known as the "target spectrum."

The product of the spatial frequency components of the target, and the lens modulation transfer function, is called the convolution of the target and the lens. This convolution describes the amplitudes of the spatial frequencies which make up the image.

The modulation transfer function of a lens achieves a general maximum for almost all spatial frequencies in the plane of best focus. By extracting the lens modulation transfer function from the convoluted spectrum, the transfer function maximum may be determined, which in turn represents a determination of the optimum focus of the lens. Adjustment resulting in a continuous maximizing of the lens modulation transfer function will cause the lens to be brought into and remain in optimum focus.

Finding the entire lens modulation transfer function and adjusting the lens so that this function is properly maximized would be the ideal theoretical method for detecting focus. However, this technique is not fully practical in an operational environment. The modulation transfer function of a lens provides the entire spatial spectral response of the lens, but for purposes of focusing an optical system, the complete lens spectrum is redundant. Only one spatial frequency (or at most, a few) of the complete lens spectrum need be closely examined. Since the modulation transfer function of the lens is maximized for virtually all spatial frequencies when the lens is in optimum focus, a single spatial frequency component or a limited range of such frequencies, may be examined to provide optimum focus.

A simple method of isolating a single spatial frequency component of the complete spectrum, is to superimpose the image upon a transparency having a sinusoidal distribution of opacity along one spatial axis. Such a transparency will extract that component which matches the spatial frequency of the sine "wave" of the transparency, filtering out all the spatial frequency components which make up the image except the one which matches the filter. Accordingly, the transparency may be called a "spatial filter."

As the spatial filter is moved in a direction so that the transmission of the image is affected by the sinusoidal distribution of opacity, the light from the image passing through the spatial filter consists of two intensity components which may be detected by a photosensing device. The first component has characteristics analogous to a "direct current" electrical term, and corresponds to overall image intensity, while the second component is analogous to an "alternating current" term and is a high frequency component with an amplitude determined by the height of the modulation transfer function for the spatial frequency being filtered. It is this component having a high frequency variation in intensity which carries the necessary information for determining focus.

When the target whose image is being examined is not moving, it is possible to use merely a moving spatial filter and a light detector as a focus sensing device. The maximum amplitude of the temporal high frequency component could be detected to determine optimum focus. If the amplitude were not maximized, the lens or platen or both, could be driven until the maximum signal is realized.

The disadvantages of this system, however, become obvious when it is realized that no servosystem is stable enough to prevent the focus adjustment from continuously "hunting" for best position. While "hunting," the system spends very little time actually in the best position.

A second objection to the simplified focus sensing device described above, is directed to the lack of certainty about the makeup of the image. If a section of the target terrain is examined, it will be noted that the intensity of light varies throughout the section. This constitutes a spatial signal which may be analyzed into its spatial frequency components, producing a second modulation transfer function descriptive only of the target section. It is this second or target modulation transfer function, convoluted with the modulation transfer function of the lens, which is actually being examined by the spatial filtering device.

In an operational system where a camera is located in a moving aircraft, the target terrain changes with time. Consequently, the component of the target modulation transfer function that is being examined by the spatial filter is also continuously changing with time. The effect of the terrain must be isolated from the modulation transfer function of the lens; otherwise, a focusing servosystem would constantly be presented with a spurious error signal.

The present invention eliminates the above-described disadvantages by incorporating a technique for isolating the lens modulation transfer function from the target spectrum, and for maximizing the isolated lens function. A parameter dependent only on the characteristics of the lens imaging system is cyclically varied at a known and controlled, precise frequency. The effects of this parameter appear as an "amplitude modulation" superimposed upon the basic high frequency variation produced by the spatial filtering.

For example, in one embodiment of the present invention, the focus position of the spatial filter is rapidly varied in order to periodically examine all regions immediately inside and outside the focus of the lens. Since the modulation transfer function of the lens decreases in magnitude as the error in focus increases, amplitude variation can be superimposed on the high frequency component. The focus sensor is therefore independent of the changes in the target terrain, and is dependent only on the focus position of the lens.

The high temporal frequency variation in intensity ultimately produced by the spatial filter can be considered to be a "carrier signal," and the amplitude modulation of the carrier signal which is due to the cyclic variation in a lens focus parameter, the "impressed modulation."

The present invention includes apparatus to detect and signal the deviation from optimum focus of an optical system image with respect to a predetermined plane, and is characterized by:

a. first means adapted to receive the image produced at the predetermined plane, for amplitude modulating the image optical spectrum to produce an optical spectrum whose amplitude varies with image focus;

b. second means optically coupled to said first means to receive said modulated spectrum for generating therefrom a periodically oscillating signal component including a limited range of spatial frequencies, said signal component amplitude varying with image focus; and c. third means connected to said first and second means for processing said signal component to generate therefrom an output signal corresponding to and representative of the error in a predetermined optical system focus parameter as between optimum focus and actual focus; whereby the polarity and magnitude of said output signal corresponds to a polarity and magnitude of correction that must be made to the predetermined optical system parameter in order to produce optimum focus of the image at the predetermined plane.

The occurrence of the maxima of the output signal, relative to a predetermined time in each cycle corresponding to optimum focus of the image, indicates the adjustment, if any, which must be applied to the optical system focus parameter in order to produce optimum focus of the image at the predetermined plane. For use with a camera, the "predetermined plane" describes the emulsion plane of the film when the film is positioned on the platen of the camera.

The output signal may be used in combination with a servosystem which automatically applies the adjustment to the optical system focus parameter, to maintain optimum focus of the image.

Many optical systems which produce an image at a predetermined plane will not normally permit the locating of the spatial filter in that plane. Most cameras are included in this class of optical system, and, when used in combination with a camera, the focus sensor usually must also include means to transfer the image which is located at the predetermined image plane to a more convenient image plane. The spatial filter will then be positioned to coincide with this more convenient "transfer image plant."

Although such transfer means allow the spatial filter to, in effect, receive the camera image which is located at the predetermined plane, employment of such means imparts certain advantages to the system. A transfer lens which will permit magnification of the camera image can be used to permit a more easily manufactured, "low spatial frequency" filter to be used in place of a "high spatial frequency" filter. In addition, the filter does not have to be held with high precision in its position along the optical axis of the transfer system, since the transfer optics will effectively demagnify the axial movements of the filter.

A second advantage provided by transfer optics relates to the ease with which the focus sensor may be calibrated. Calibration is achieved by simply moving the transfer lens along its optical axis until the proper conditions are met, thus obviating the necessity for moving more unwieldy mechanical assemblies.

A further advantage is that the transfer system can be made to compensate for some of the aberrations in the camera lens, thereby increasing the accuracy of the focus sensor, which is best located off the optical axis of the camera, so that the sensor does not interfere with that portion of the camera image falling upon the film.

A camera focus parameter which lends itself to easy adjustment, is the distance from the camera lens to the predetermined plane. Appropriate repositioning of the camera lens along its optical axis brings the camera image into optimum focus at the emulsion plane of the film. Variation of this distance parameter causes a corresponding variation in the image focus, with respect to the predetermined plane. Since the spatial filter is positioned to receive the image which is located at the predetermined plane, whether directly or by transfer optics, variation of the distance parameter corresponds to repositioning a perfect image with respect to the spatial filter.

Conversely, the position of the spatial filter with respect to a perfect image can be varied without moving the camera lens in order to produce an effect equivalent to varying this parameter. A cyclic repositioning of the spatial filter with respect to the location of a perfect image will modulate the carrier signal so that its amplitude exhibits a cyclic variation dependent upon image focus.

This same result can be accomplished by allowing the spatial filter to remain stationary with respect to the optical axis, and to reposition the transfer lens so that the image at the spatial filter is brought in and out of focus also without moving the camera lens.

For purposes of signal processing, however, the amplitude modulation impressed by the rapid focus shift should have a frequency of at least a 100 cycles per second. On an aircraft, 400 c.p.s. alternating current, for example, is readily available. One convenient method of producing the effect of rapid cyclical repositioning of the spatial filter may be accomplished in reliance on the phenomenon that a plane parallel sheet of glass introduced perpendicular to the path of converging light rays, shifts the focal point of the converging rays toward the glass plate by a distance approximately equal to one-third the thickness of the plate. A change in thickness of the glass plate causes a corresponding change in the position of the focal point of the rays. Therefore, the insertion of a glass plate of varying thickness between the transfer lens and the spatial filter causes the image which falls on the spatial filter to exhibit corresponding variations in focus.

The thickness of the glass plate inserted in the optical path may be changed by sequentially removing a glass plate of one thickness and replacing that plate with another of different thickness. This is conveniently accomplished by providing a circular glass disc with plates of varying thickness cemented along the outer section of the disc. As the disc is rotated, the plates are sequenced. An intermediate combination of base disc and plate thickness serves as a reference. When this reference portion of the plate is in the optical path, and the transfer lens provides an image which is in optimum focus at the spatial filter, optimum focus of the camera image located at the predetermined plane may be assumed, based upon an initial alignment and adjustment of the entire system.

This technique actually provides a step or incremental change in focus, in which the steps are as small or as large as desired. If the plates are replaced by thin wedge prisms, the incremental changes can be converted into a more continuous change. Such wedges, which could be provided as spiral ramps on the supporting glass disc, then permit continuous changes of focus and allow excellent vernier control. An intermediate thickness is still used as a reference. The spiral form of the wedge would tend to keep the optical deviation pointed in one direction as the disc rotates, and a compensating glass wedge may be provided to correct this deviation.

This method of "shifting" focus starts by examining a region at a reasonable distance inside or outside the predetermined plane. The plane examined is gradually shifted until, in the middle of the "scan," it coincides with the plane of actual focus. The focus scan continues until a plane is reached which is an equal distance on the other side of actual focus from the starting point. The plane being examined is then shifted instantly back to the original starting point, and another scan commences. At optimum focus of the camera system, the point of actual focus coincides with the observation of the "best" image. At all other times, the "best" image is seen at a different time in the scan cycle.

A preferred embodiment of the present invention employs a rotating disc focus scanner. The rim of the disc, however, is extended to form a drum, and the spatial filter is located on the surface of this drum. As the drum rotates, the rays of the scanned image are deflected so that they pass through the spatial filter on the drum surface.

The modulated carrier signal which emerges from the spatial filter is thereupon received by a photoelectric transducer. By suitable signal processing, an output signal is extracted from the carrier signal, which is related to the deviation from optimum focus of the camera image. A servosystem may be provided to reposition the camera lens along its optical axis, in response to the output signal, in order to maintain optimum focus of the camera image at the predetermined plane.

In an alternative embodiment of the present invention, the spatial filter consists of a rotating disc having radial transparent and opaque lines near its edge. The slight angle between the lines at the edge of the disc allows a narrow band of spatial frequencies to be examined rather than a single spatial frequency.

In the case of a stationary image, the change in tangential velocity with radius exactly equals the change in spatial frequency, in which case the carrier signal retains its spectral purity. However, in an operational system where the target is moving, the image velocity component, being linear and not tangential, will produce a slight frequency dispersion of the carrier signal. To some extent, this dispersion can be shaped and reduced, for example, by the proper use of out of focus stops and by positioning the focus sensor on the leading or trailing edge of the platen, so that the direction of motion of the image is perpendicular to the direction of spatial filtering. Where the effect of this dispersion is tolerable, a considerable reduction in cost and complexity can be obtained by using such a disc filter rather than the drum filter of the preferred embodiment.

In this alternative embodiment, the rotating disc focus scanner is positioned between the transfer lens and the spatial filter, and a photoelectric transducer is positioned to receive the modulated carrier signal. A servosystem may also be provided to reposition the camera lens to maintain optimum focus of the image at the emulsion plane of the film at the camera platen.

Another alternative embodiment of the present invention allows the spatial filter to remain fixed in place, and permits rotation of only the focus scanning disc. Since the carrier signal is generated by the motion of the image, this alternative embodiment is useful if the camera in which it is installed is flown within a reasonably well controlled altitude, velocity and orientation range. Because the carrier signal would have considerable frequency instability, a device which would allow the processing electronics to track the carrier signal may be necessary. A servosystem may also be provided, as in the above embodiments. This embodiment possesses the advantages of mechanical simplicity and wide mechanical tolerances, permitting a substantial decrease in cost when suitable operational conditions obtain.

In a third alternative embodiment of the present invention, the focus scanning and spatial filter functions are combined in a single disc. This disc has radial transparent and opaque lines near its edge, and is slightly inclined from a perpendicular to the optical axis. When the disc is caused to rotate about an axis parallel to the optical axis, any point on its edge will oscillate in the direction of the optical axis. This oscillation performs the function of focus scanning of the image. Because the impressed modulation is of a slightly different form than the modulation generated by the other techniques described above, a slightly different means of electronic signal processing must be employed. Such signal processing, however, is known within the state of the art. This embodiment possesses the advantages of both mechanical and optical simplicity.

A fourth alternative embodiment of the present invention employs a spatial filtering disc having radial transparent and opaque lines near its edge, and the disc is rotatable about an axis parallel to the optical axis. While the disc rotates, it also reciprocates along the optical axis so that it further performs the function of focus scanning of the image.

Accordingly, it is an object of the present invention to provide an improved focus control system utilizing spatial frequency filtering.

It is an additional object of the invention to provide a device that analyzes the spatial frequency output of a lens system to detect the plane at which true focus of the lens occurs.

It is yet an additional object of the invention provide means for extracting modulation transfer function information from a lens system by means of a novel spatial filtering method.

It is still another object of the invention to provide a system for locating the plane of best focus of a lens or imaging device with respect to an arbitrary predetermined plane, and which generates an error signal corresponding to the difference between the two planes for purposes of focus correction.

It is a further object of the invention to provide a means for extracting spatial frequency spectrum information corresponding to an object being imaged from the modulation transfer function of a lens system.

It is a still further object of the invention to provide an improved servosystem for improving optical system focus using electronic signal processing techniques.

It is another object of the invention to provide means for shifting the focus of an image at a predetermined plane in a cyclical fashion and for extracting from said shifting image, a limited spatial frequency spectrum upon which is superimposed an amplitude variation, corresponding to the shifts in focus, to generate a first cyclical signal synchronized to said focus shifting element and a second signal corresponding to said extracted signal maxima, and to provide means for modifying the system focus to bring said first and second signals into a predetermined time relationship.

The novel features which are believed to be characteristic of the invention, together with further advantages thereof, will be better understood from the following description considered in connection with the accompanying drawings in which certain preferred embodiments of the invention are illustrated by way of example. It is expressly understood, however, that the drawings are for the purpose of illustration and description only, and are not intended as a definition of the limits of the invention.

Figure 1:
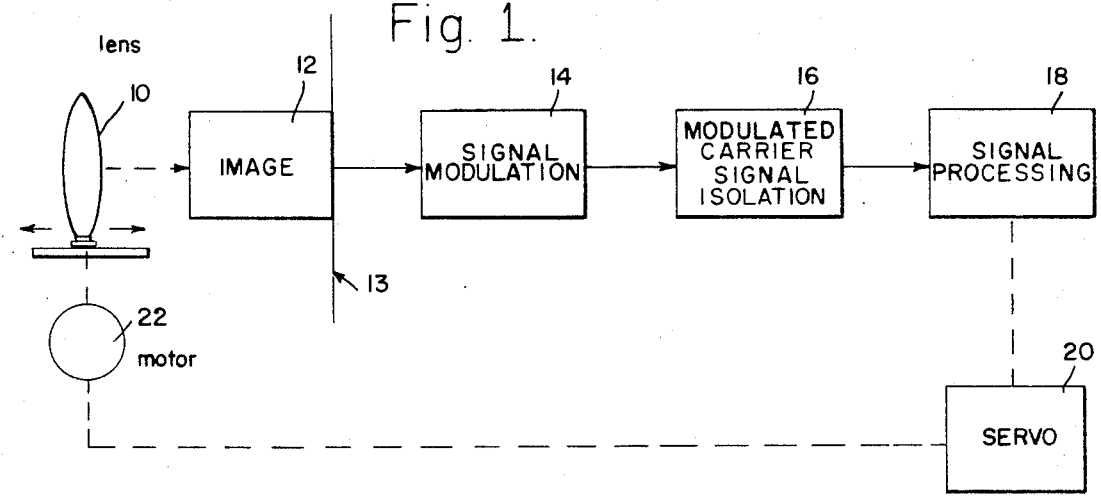
FIG. 1 is a block diagram of focus control system according to the present invention, in combination with a camera.

With reference to the drawings, there is shown in FIG. 1 a block diagram which sets forth the function and interrelations of the various elements of the present invention when used in conjunction with a camera. A camera lens 10 projects an image 12 at or near a predetermined plane 13 which coincides with the emulsion plane of the film within the camera.

The camera image spectrum is amplitude modulated by signal modulation means 14, and a modulated carrier signal portion of the spectrum is then isolated by modulated carrier signal isolation means 16.

The modulation impressed upon the carrier signal is dependent upon a camera lens focus parameter in this embodiment, the distance between the lens 10 and the predetermined plane 13. The resultant modulated carrier signal includes amplitude components which vary with the image focus. This modulated carrier signal is then processed by signal processing means 18, to extract therefrom an output signal which is representative of an error in the camera lens focus parameter.

If this output signal is electrical in nature, it may be used to actuate a servosystem 20. Since the camera lens focus parameter is related to the position of the camera lens 10 along its optical axis, the servosystem 20 may be employed to drive a motor 22 to reposition the camera lens 10 so that its image 12 is maintained at optimum focus at the predetermined plane 13.

Figure 2:
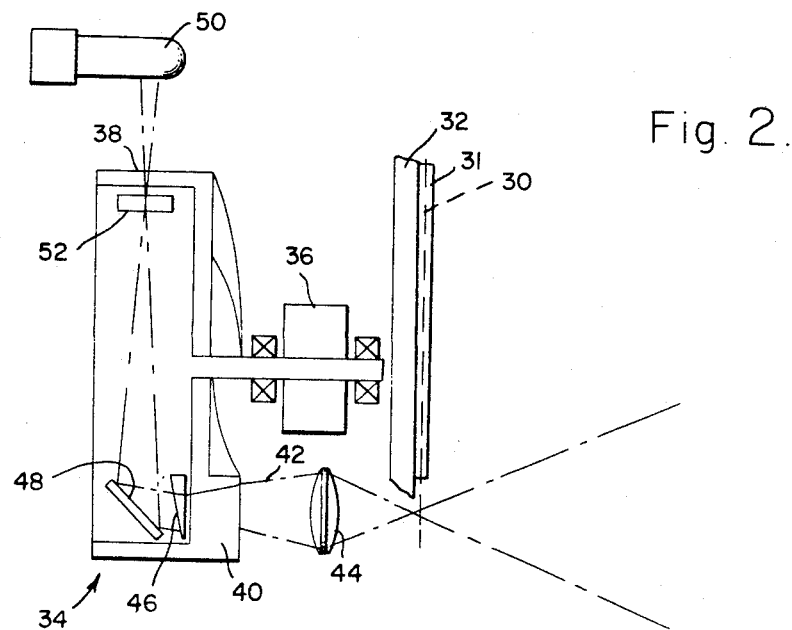
FIG. 2 is a diagrammatic cross-sectional representation of the optical portion of a preferred embodiment of a focus control system according to the present invention, utilizing a drum member incorporating the scanning disc and a spatial filter.

Turning next to FIG. 2, a diagrammatic cross-sectional representation of the optical portion of a preferred embodiment of the present invention is shown. A predetermined image plane 30 is shown as the plane of proper focus of a camera image, and coincides with the proper placement of the emulsion plane of a photographic film 31 with respect to a platen 32 of a camera.

A glass drum 34 is adapted to be positioned behind the platen 32, and may be rotated about an axis orthogonal to the platen 32 by means of a motor 36. A transparency 38 having a sinusoidal distribution of opacity along the direction of drum rotation is superimposed upon the periphery of the drum 34; this transparency is hereinafter known as the spatial filter 38.

The end of the drum 34, facing the platen 32, is transparent and contains thereon a series of spiral ramps 40, or optical wedges. Although these ramps could be substituted by cyclically progressive plane parallel steps, the former is shown as being employed in the preferred embodiment.

The optical path associated with an image located near the predetermined plane 30 is indicated by the broken line 42. A transfer lens 44 is positioned between the drum 34 and the predetermined plane 30, the primary function of which is to transfer the image located at the predetermined plane 30 to the spatial filter 38. A compensating wedge 46 is provided to correct for any optical deviation and aberration which may be caused by the ramps 40.

The optical path is then deflected by a reflector 48, and the light rays thereupon pass through the spatial filter 38 and strike a photomultiplier 50. A field lens 52 may be provided to ensure proper conformity of the transferred image to the curvature of the drum 34.

As the drum 34 rotates, the ramps 40 are advanced and the change in the average thickness of the ramp combination in the field of view causes a change in image focus, thus modulating the entire spatial frequency spectrum. The scanned image then passes through the spatial filter 38, and the modulated carrier signal corresponding to a single spatial frequency or a limited range of spatial frequencies, emerges and is received by the photomultiplier 50.

Figure 3:
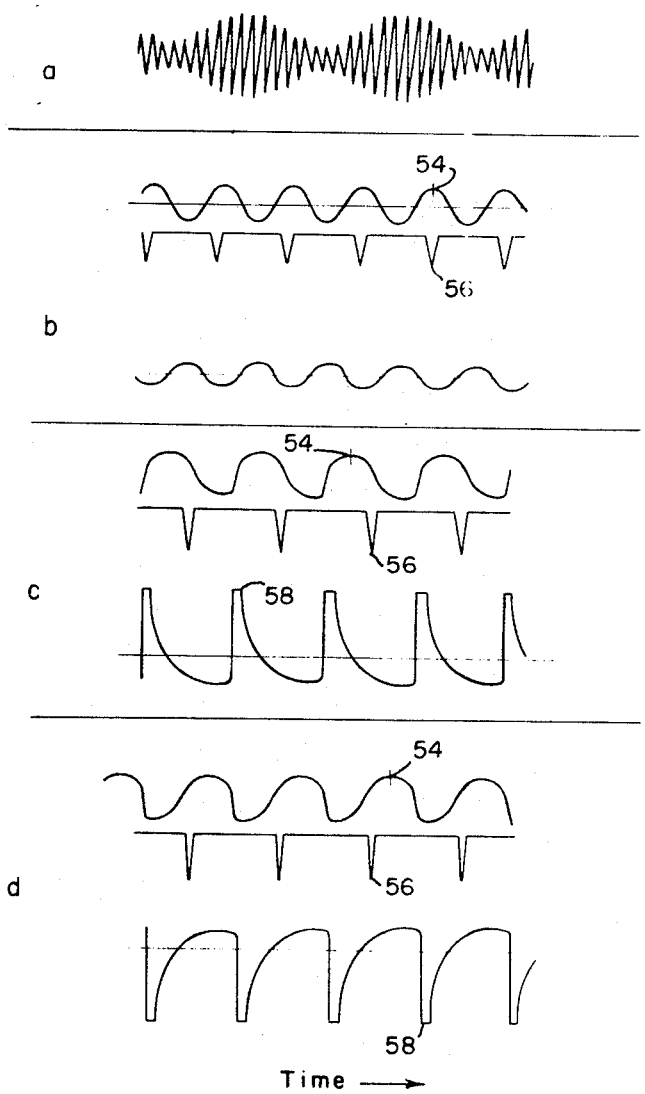
FIG. 3 is a series of idealized diagrams, illustrating the form of the modulated carrier signal, representative forms of the modulation impressed on the carrier signal, and the corresponding derivatives of the impressed modulation for various focus conditions.

In FIG. 3a, there is shown the general form of the modulated carrier signal with time produced by the embodiment of the present invention. The instantaneous amplitude of the signal is dependent upon the focus error of the scanned image.

Representative forms of the modulation impressed on the carrier signal are shown in FIG. 3b through 3d. The method of scanning focus which is employed in the preferred embodiment, starts by examining a region at a reasonable distance inside or outside the predetermined plane. The plane examined is gradually shifted as the scanning ramp is advanced until, in the middle of the focus scan, it coincides with the plane corresponding to actual focus. The focus scan continues until a plane is reached which is at a predetermined, preferably equal distance on the other side of actual focus from the starting point. The plane being examined is then shifted almost instantly back to the original starting point, and another scan commences. If there is no focus defect at the predetermined image plane, and the modulation transfer function curve decreases virtually symmetrically with positive or negative focus defect, the impressed modulation is continuous and resembles a sine wave. The maximum value 54 of this signal coincides with an indexing signal which occurs when the position of actual focus of the lens is in the optical path.

The indexing signal produces a pulse 56 as a marker. The time coincidence of sine wave maximum 54 and the marker pulse 56 indicates that optimum focus has actually been established. It is noted that the first derivative of the impressed modulation when at optimum focus, is also continuous and produces a cosine-line function.

The impressed modulation associated with defects in focus are shown in FIG. 3c and d. The modulated waveform in these cases is discontinuous. For each period which is associated with a ramp scan, the position of best focus signalled by a maximum 54 does not coincide with the actual focus position 56 as signalled by the marker pulse 56. Differentiation of this signal produces a series of "spikes" 58 from which an indication of the direction and magnitude of focus error can be derived.

There exist in the art, known data processing techniques for isolating an impressed modulation signal from modulation "noise" which may be produced in the photomultiplier, by variations in terrain, and from other sources. Techniques are also available for extracting the focus information which is contained in this signal. One simple method for extracting this focus information, for example, would be to include a pulse generator in the focus scanner which would produce the marker pulse 56 in a separate electronic circuit when the plane corresponding to actual focus is being examined.

In order to bring the image at the predetermined plane into proper focus, the camera lens may be adjusted until the marker pulse 56 and the peak value 54 of the impressed signal, coincide in time. A servosystem may be provided to automatically reposition the camera lens in response to an error signal which can be derived either from a time comparison or from the differentiated signal.

Figure 4:
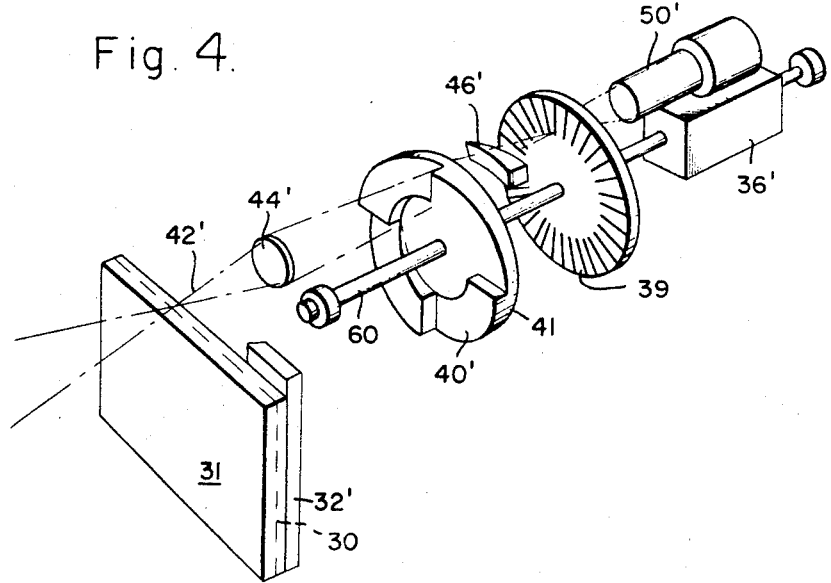
FIG. 4 is a perspective representation of an alternative embodiment according to the present invention utilizing a coaxial scanning disc and filter.

In FIG. 4, there is shown a diagrammatic perspective representation of the optical portion of an alternative embodiment according to the present invention. Primed reference numbers are applied to components similar to those of the preferred embodiment of FIG. 2.

In this alternative embodiment, the focus scanning ramps 40' are positioned along the outer section of a disc 41. The spatial filter consists of a transparent disc 39 having radial transparent and opaque lines on one face. The spatial filter disc 39 may be located beween the focus scanning disc 41 and the photomultiplier 50'. The centers of the spatial filter disc 39 and the focus scanning disc 41 are aligned and attached to a shaft 60 which is rotated by a motor 36'.

The additional elements of the system are also included, comprising the focal plane 30', the film 31', the platen, 32', the optical rays 42', the transfer lens 44', and the compensating wedge 46'.

Figure 5:
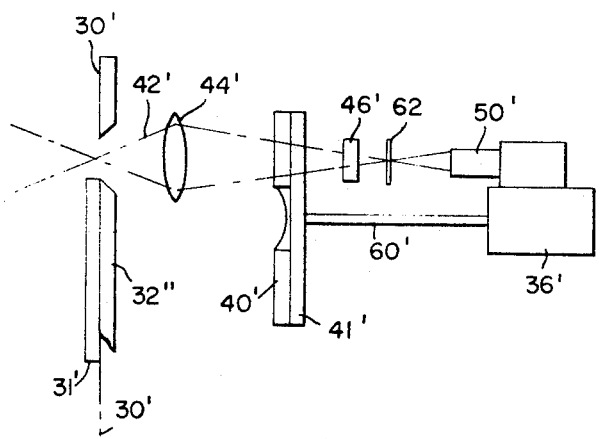
FIG. 5 is a representation of the optical portion of a second alternative embodiment according to the present invention utilizing a stationary spatial filter.

In FIG. 5, there is shown a diagrammatic cross-sectional representation of the optical portion of a second alternative embodiment of the present invention which utilizes the elements of the embodiment of FIG. 4. In this second alternative embodiment, a spatial filter 62 remains fixed in place, and the focus scanning disc 41' is allowed to rotate. Since the spatial filter 62 is stationary, the carrier signal is generated by the motion of the image. An apertured platen 32'' is used so that an image out of the film format will be utilized in the optical path.

Figure 6:
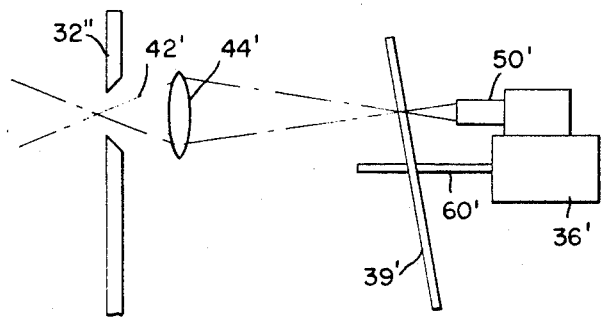
FIG. 6 is a representation of the optical portion of a third alternative embodiment according to the present invention utilizing a wobbling spatial filter.

In FIG. 6, there is shown a diagrammatic cross-sectional representation of the optical portion of yet a third alternative embodiment according to the present invention in which the optical scanning disc can be omitted. To accomplish the same results, a spatial filter disc 39' is slightly inclined from perpendicular with respect to an axis orthogonal to the image plane. When the disc 39' is rotated, the edge of the disc will oscillate through the transfer image plane. This oscillation cyclically varies the focus of the transfer image with respect to the spatial filter 39'.

Figure 7:
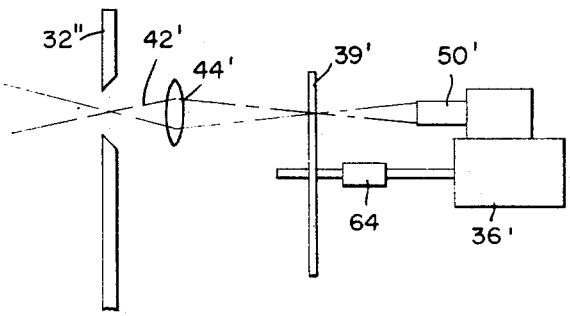
FIG. 7 is a representation of the optical portion of a fourth alternative embodiment according to the present invention utilizing a reciprocating spatial filter.

In FIG. 7, there is shown a diagrammatic cross-sectional representation of the optical portion of a fourth alternative embodiment according to the present invention in which the optical scanning disc is also omitted. The spatial filter disc 39' is rotatable about an axis orthogonal to the image plane as in the embodiment of FIG. 4. While the disc 39' rotates, it is caused to reciprocate axially through the transfer image plane by means of a reciprocating device 64. In this manner, the focus of the image received by the spatial filter is caused to be cyclically varied, and the optical scanning system is not necessary.

Figure 8:
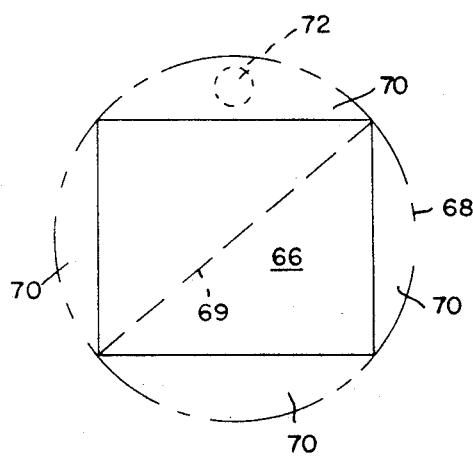
FIG. 8 is a front view of an image plane of a camera, indicating the placement of a focus sensor according to the present invention.

Turning next to FIG. 8, the relative placement of a focus sensor is represented. Assuming a camera is equipped with a rectangular platen, the film format 66 is also rectangular (conforming to the platen). A circular image 68 formed at the emulsion plane of the film by the circular camera lens, is at least as large in diameter as the diagonal 69 of the film format 66. Therefore, there are portions 70 which are entirely outside of the film format 66. It is this portion of the image, for example at aperture 72, which is examined.

Thus, there has been shown in several embodiments, an invention for monitoring an image at a predetermined image plane of an optical system, including means for signalling errors in focus, and more specifically, for the automatic maintaining of a camera image in optimum focus.

Limitations of the invention are a function only of the accuracy of the optical, mechanical and electronic components which make up the sensor. As lenses improve, making the need for a good focus sensor more critical, the technology which produces the improved lenses will allow production of improved and more accurate focus sensors according to the present invention. Thus, the focus sensing technique described above should always keep pace with the requirements of optical science as presently conceived.

Other embodiments of the present invention and modifications of the embodiments herein presented may be developed without departing from the essential characteristics thereof.

Accordingly, the invention should be limited only by the scope of the claims appended below.

I claim:

1. Apparatus to detect and signal the deviation from optimum focus of an optical system image with respect to a predetermined plane, comprising the combination of:
   a. transfer means, optically coupled to the predetermined plane for transferring the optical image thereat to a remote transfer plane;
   b. defocusing means, including a rotating disc of transparent material of variable wall thickness in a preordered pattern, for cyclically modifying the focus of the image at the transfer plane to amplitude modulate the signal representing the optical image and to generate an index signal calibrated to represent actual focus of the optical system;
   c. spatial filtering means interposed in the optical path in the vicinity of the transfer plane, including an interposed element of opacity varying in a preselected pattern, for transmitting spatial frequency components of the optical image corresponding to the preselected pattern wherein said spatial filtering means is a transparent disc rotatable about an axis central thereto, and wherein said preselected pattern of opacity is arranged to be uniform radially and to vary angularly about the face of said disc;
   d. sensing means optically coupled to receive the image at the transfer plane and operable in response to the light signals therefrom, to derive from the impinging signals an output signal corresponding to optimum focus; and
   e. error generating means coupled to said defocusing means and said sensing means and operable in response to index and output signals therefrom to produce an error signal representing the direction and magnitude of the deviation from optimum focus of the image at the predetermined plane.

2. The apparatus of claim 1, above, wherein said rotatable disc wall thickness varies by incremental amounts.

3. The apparatus of claim 2, above, wherein said rotatable disc wall thickness is uniform in the radial direction and varies continuously according to a preordered pattern in the angular direction.

4. The apparatus of claim 2, above, wherein said rotatable disc wall thickness varies in a limited angular band and where said wall thickness increases to a predetermined maximum and abruptly decreases to a predetermined minimum.

5. The apparatus of claim 2, above, wherein said rotatable disc wall thickness varies in linear fashion from minimum to maximum thickness.

6. Apparatus to detect and signal the deviation from optimum focus of an optical system image with respect to a predetermined plane, comprising the combination of:
   a. transfer means, optically coupled to the predetermined plane for transferring the optical image thereat to a remote transfer plane;
   b. defocusing means, including a rotating disc of transparent material of variable wall thickness in a preordered pattern, for cyclically modifying the focus of the image at the transfer plane to amplitude modulate the signal representing the optical image and to generate an index signal calibrated to represent actual focus of the optical system;
   c. spatial filtering means interposed in the optical path in the vicinity of the transfer plane including an interposed element of opacity varying in a preselected pattern for transmitting spatial frequency components of the optical image corresponding to the preselected pattern, wherein said defocusing and spatial filtering means comprise an axially rotatable transparent drum having a peripheral rim and an end, optically coupled to said transfer means to receive light rays from the image through a portion of said end, said transfer plane coinciding with a portion of said peripheral rim, said defocusing means being positioned on said end, and said spatial filtering means being superimposed on said rim;
   d. sensing means optically coupled to receive the image at the transfer plane and operable in response to the light signals therefrom, to derive from the impinging signals an output signal corresponding to optimum focus; and
   e. error generating means coupled to said defocusing means and said sensing means and operable in response to index and output signals therefrom to produce an error signal representing the direction and magnitude of the deviation from optimum focus of the image at the predetermined plane.

7. The apparatus of claim 6, above, wherein said defocusing means include said drum end having variable wall thickness in a preordered pattern.

8. The apparatus of claim 7, above, wherein said end wall thickness varies by incremental amounts.

9. The apparatus of claim 8, above, wherein said end wall thickness is uniform in the radial direction and varies continuously according to a preordered pattern in the angular direction.

10. The apparatus of claim 8, wherein said end wall thickness varies in a limited angular band and where said wall thickness increases to a predetermined maximum and abruptly decreases to a predetermined minimum.

11. The apparatus of claim 8, above wherein said end wall thickness varies in linear fashion from minimum to maximum thickness.

12. The apparatus of claim 6, above, wherein said spatial filter means includes a preordered distribution of opacity on said peripheral rim.

13. The apparatus of claim 12, above, wherein said preordered distribution of opacity is a sinusoid.